United States Patent
Gu

(10) Patent No.: US 7,995,247 B2
(45) Date of Patent: Aug. 9, 2011

(54) EMBEDDING COMPUTER INFORMATION INTO PRINTED MEDIA AND PROCESS METHOD THEREOF

(76) Inventor: Zecang Gu, Tianjing (CN)

( * ) Notice: Subject to any disclaimer, the term of this patent is extended or adjusted under 35 U.S.C. 154(b) by 981 days.

(21) Appl. No.: 11/430,690

(22) Filed: May 8, 2006

(65) Prior Publication Data

US 2006/0256386 A1 Nov. 16, 2006

(30) Foreign Application Priority Data

May 12, 2005 (JP) .................................. 2005-139859
Feb. 21, 2006 (CN) ........................... 2006 1 0008124

(51) Int. Cl.
*H04N 1/40* (2006.01)
*H04N 1/405* (2006.01)
(52) U.S. Cl. ...... 358/3.28; 358/3.06; 358/534; 358/536; 358/3.03
(58) Field of Classification Search .................. 358/3.28, 358/3.06, 534, 536, 1.9, 3.03, 3.08, 3.09, 358/3.1, 3.3; 399/180, 181; 347/131; 345/596
See application file for complete search history.

(56) References Cited

U.S. PATENT DOCUMENTS

| 3,598,993 | A | * | 8/1971 | Kaufer et al. ................. | 250/319 |
| 2003/0020678 | A1 | * | 1/2003 | Ozawa et al. ................... | 345/87 |
| 2004/0013284 | A1 | * | 1/2004 | Yu ................................. | 382/100 |
| 2006/0170974 | A1 | * | 8/2006 | Wang et al. .................. | 358/3.06 |

* cited by examiner

*Primary Examiner* — Dov Popovici
(74) *Attorney, Agent, or Firm* — Matthias Scholl P.C.; Matthias Scholl

(57) ABSTRACT

The present invention provides a method of generating information embedded halftone screen code. According to this method, massive digital information can be stored through printing on at least one type of print media. The information embedded can be read and recognized simply and reliably. The quality of the images will not be reduced after information embedded. The information printed on the media includes a predetermined array of halftone dots with different morphology including physical and geometrical characteristics, which forms the computer codes to embed information into printed content. The advantages of this invention are: the maximum similarity value can be reduced to under the threshold value according to this method; the recognition performance of the halftone screen code can be improved; and robustness can still be maintained at a high level even though the paper is defected or polluted.

20 Claims, 12 Drawing Sheets

(1) $B_{4,i} \oplus B_{5,i}$ (2) $d(C_4, C_5) = \sum_{i=0}^{15}(B_{4,i} \oplus B_{5,i}) = 8$ 18 Dec, 2004
Order No 0408218

Delivery Order

Apollo Japan Co., Ltd

Nippon Print Co., Ltd
100-001 Tokyo Chiyoda Otemachi
Tel:03-1234-5678 FAX: 03-8765-4321
Officer: Yomada Hanako According to the following content delivery

| Total amount, including tax:7588740574779187 | | | |
|---|---|---|---|
| Content | Quantity | Unit Price | Amout |
| ************************ | ** | ***** | ****** |
| ******************** | ******* | ************ | ************ |
| *************** | ******* | ************ | ************ |
| ***************************** | ******* | ********** | ************ |
| Subtotal | ******* | | ************ |
| Consumption tax 5% | | | ************** |
| Amount in toal | | | ************** |

FIG. 18

EMBEDDING COMPUTER INFORMATION INTO PRINTED MEDIA AND PROCESS METHOD THEREOF

BACKGROUND OF THE PRESENT INVENTION

1. Field of Invention

The present invention relates to an information embedding halftone screen encoding system serviceable for printed media, and particularly, relates to a method for generating information embedding halftone screen code.

2. Description of Related Arts

In recent years, people in this field have been dedicating intensive enthusiasm to the research of digital watermarking theory about embedding computer information into printed images or image backgrounds. For example, Japanese patent 2003-209679 discloses the interpolation identifying technology of detecting falsified printed documents via digital watermarking. This information embedding method is achieved by representing "1" or "0" with information modules having different inclined angles, followed by classical Fourier Transform to calculate the spreading directions of the different information modules. A distinctive drawback of such method is low efficiency of information recording. Especially, when information embedded is mixed with the printed contents, some of the printed contents might go through the Fourier transform randomly as well, thus introducing many stochastic noises and affecting the recognition rate. In addition, a similar technology has been published in China (East China Jiao Tong University Gazette Vol. 21, No. 1, February, 2004). It is well-known that the information embedding technology would deteriorate the quality of original image.

Japanese patent (2004-007442) discloses another technology of identifying interpolations of recognized document information. This technology is achieved by converting the signature information or document information into individual small-size arrays to be utilized as digital watermark. Accordingly, the watermark images could be overprinted onto the target images for functional embedding purposes. On the other hand, images embedded with information, i.e. the integrated images could be segmented into a plurality of sub-images. By approximately calculating the correlation function values of the integrated image and the segmented images, the embedded information would be identified. However, since grey-scale of the target image to be embedded is not considered, the quality of the original image is inevitably damaged because of the overprinting procedure. Moreover, in order to enhance the robustness of anti-attack functions of the code, same information has been repetitively embedded into every basic array, thus significantly reducing the embedding efficiency. Furthermore, although the correlation coefficients are introduced in the encoding-detecting process, some important concepts, such as minimizing the maximum similarity value between codes, have been neglected.

Japanese patent (8-208196) "Code Printing Device and Code Printing Media Thereof" is the first case to disclose storing digital message onto paper. The main idea is to print defined dot code onto paper in hope of storing multimedia message, such as sound, onto paper. It is noted that such techniques are rather similar with two-dimensional bar, wherein a dot represents "1" and a blank represents "0" or vice versa. In reality, the encoding-detecting process of such method is difficult. This is due to the fact that under a high density dot matrix circumstance, the detecting process would be affected by misplacement of dots, distortion of target images, noise of the printing process, or paper defects. And more importantly, such method did not weigh a consideration of the characteristics of the halftone screen. Therefore, its aim is different from the aim of mixing information into printed contents as background or that of embedding a great deal of information into the related images.

The technology of embedding information into images is widely known because of the disclosure of Japanese patent (09-172537) and its U.S. Pat. No. (6,069,636) "Embedding information into images by varying pixel parameters". This invention focuses on embedding message into target images or background images by representing the code "1" or "0" through varying pixel parameters like its shape, direction, or size. Additionally, different gray-scales could be selectively replaced by adjusting the pixel size. However, as a binary system, the embedding message could only be represented by "1" and "0". And the maximum similarity would be too big between different codes. Also, the method merely embeds messages based on the tiny geometrical variances among pixel dots, without considering the differences of physical characteristic of the pixels. Finally, to detect the pixel dots employed for encoding message through tiny position displacement, reference pixel dots would have to be setup at two sides of the primary pixel dot. As a result, the information storage capacity would be reduced to below one third of original capacity.

Japanese patent (2002-234640) "Image Process Device and Process Method Thereof" discloses another method of embedding information into images. Aiming to embed binary sequence of "1" and "0" into target images to represent administrative information (copyright issue), the target images are segmented into many rectangles, each of which arrayed with 8*8 dot images, wherein each of the dot images is composed of 10*10 pixels. The different dot images are used to define "1" or "0" of the message. The same information would be repetitively generated in different rectangles. So the represented information of different rectangles would be the same. Afterwards, the rectangles containing dot images would be overprinted onto the original images to ultimately embed the encoded messages. It is noted that if the grayscale of the original image is larger than the grayscale of the dot image, the embedded information might be lost in application. On the other hand, if the grayscale of the original image is smaller than the grayscale of the dot image, it is likely that the quality of the original image would be reduced. Obviously, the information storing capacity would be very low since similar information is repeatedly embedded.

All the cases above are based on the traditional binary code. Here, it is worth pointing out that there is an unavoidable maximum similarity problem existing in the conventional binary code.

Equation 3 represents an example of a traditional binary code. Example (a) illustrates a method of generating a code. Example (b) illustrates the corresponding symbols with array relationship.

To obviate the pollution attack from paper, a 4-bit hexadecimal code could be repeatedly embedded for 4 times to generate a 16-bit hexadecimal code as shown in example (a). As shown in example (b), the code value is denoted by k, and the numbers next to k represent the numbers of code bits.

(a)
$$\begin{matrix} 0 & 1 & 0 & 0 \\ & \Downarrow & & \\ 0 & 1 & 0 & 0 \\ 0 & 1 & 0 & 0 \\ 0 & 1 & 0 & 0 \\ 0 & 1 & 0 & 0 \end{matrix}$$ [Equation 3]

(b)
$$\begin{matrix} B_{k,0} & B_{k,1} & B_{k,2} & B_{k,3} \\ B_{k,4} & B_{k,5} & B_{k,6} & B_{k,7} \\ B_{k,8} & B_{k,9} & B_{k,10} & B_{k,11} \\ B_{k,12} & B_{k,13} & B_{k,14} & B_{k,15} \end{matrix}$$

Equation 4 is an example of the code formation from equation 3.

$$\begin{array}{llll}
D_0: 0\ 0\ 0\ 0 & D_8: 0\ 0\ 0\ 1 \\
\phantom{D_0:} 0\ 0\ 0\ 0 & \phantom{D_8:} 0\ 0\ 0\ 1 \\
\phantom{D_0:} 0\ 0\ 0\ 0 & \phantom{D_8:} 0\ 0\ 0\ 1 \\
\phantom{D_0:} 0\ 0\ 0\ 0 & \phantom{D_8:} 0\ 0\ 0\ 1 \\
\\
D_1: 1\ 0\ 0\ 0 & D_9: 1\ 0\ 0\ 1 \\
\phantom{D_1:} 1\ 0\ 0\ 0 & \phantom{D_9:} 1\ 0\ 0\ 1 \\
\phantom{D_1:} 1\ 0\ 0\ 0 & \phantom{D_9:} 1\ 0\ 0\ 1 \\
\phantom{D_1:} 1\ 0\ 0\ 0 & \phantom{D_9:} 1\ 0\ 0\ 1 \\
\\
D_2: 0\ 1\ 0\ 0 & D_A: 0\ 1\ 0\ 1 \\
\phantom{D_2:} 0\ 1\ 0\ 0 & \phantom{D_A:} 0\ 1\ 0\ 1 \\
\phantom{D_2:} 0\ 1\ 0\ 0 & \phantom{D_A:} 0\ 1\ 0\ 1 \\
\phantom{D_2:} 0\ 1\ 0\ 0 & \phantom{D_A:} 0\ 1\ 0\ 1 \\
\\
D_3: 1\ 1\ 0\ 0 & D_B: 1\ 1\ 0\ 1 \\
\phantom{D_3:} 1\ 1\ 0\ 0 & \phantom{D_B:} 1\ 1\ 0\ 1 \\
\phantom{D_3:} 1\ 1\ 0\ 0 & \phantom{D_B:} 1\ 1\ 0\ 1 \\
\phantom{D_3:} 1\ 1\ 0\ 0 & \phantom{D_B:} 1\ 1\ 0\ 1 \\
\\
D_4: 0\ 0\ 1\ 0 & D_C: 0\ 0\ 1\ 1 \\
\phantom{D_4:} 0\ 0\ 1\ 0 & \phantom{D_C:} 0\ 0\ 1\ 1 \\
\phantom{D_4:} 0\ 0\ 1\ 0 & \phantom{D_C:} 0\ 0\ 1\ 1 \\
\phantom{D_4:} 0\ 0\ 1\ 0 & \phantom{D_C:} 0\ 0\ 1\ 1 \\
\\
D_5: 1\ 0\ 1\ 0 & D_D: 1\ 0\ 1\ 1 \\
\phantom{D_5:} 1\ 0\ 1\ 0 & \phantom{D_D:} 1\ 0\ 1\ 1 \\
\phantom{D_5:} 1\ 0\ 1\ 0 & \phantom{D_D:} 1\ 0\ 1\ 1 \\
\phantom{D_5:} 1\ 0\ 1\ 0 & \phantom{D_D:} 1\ 0\ 1\ 1 \\
\\
D_6: 0\ 1\ 1\ 0 & D_E: 0\ 1\ 1\ 1 \\
\phantom{D_6:} 0\ 1\ 1\ 0 & \phantom{D_E:} 0\ 1\ 1\ 1 \\
\phantom{D_6:} 0\ 1\ 1\ 0 & \phantom{D_E:} 0\ 1\ 1\ 1 \\
\phantom{D_6:} 0\ 1\ 1\ 0 & \phantom{D_E:} 0\ 1\ 1\ 1 \\
\\
D_7: 1\ 1\ 1\ 0 & D_F: 1\ 1\ 1\ 1 \\
\phantom{D_7:} 1\ 1\ 1\ 0 & \phantom{D_F:} 1\ 1\ 1\ 1 \\
\phantom{D_7:} 1\ 1\ 1\ 0 & \phantom{D_F:} 1\ 1\ 1\ 1 \\
\phantom{D_7:} 1\ 1\ 1\ 0 & \phantom{D_F:} 1\ 1\ 1\ 1 \\
\end{array}$$ [Equation 4]

$D_k$ is supposed to be a code, which is made up of the elements referred to as bit. In addition, the code's length is defined as the number of all the bits.

The code comprises 16 types expressed by 0-9 and A-F. For example, all the entries in code 0 ($D_0$) are all 0. The entries for code 1 ($D_1$) $B_{1,0}$, $B_{1,4}$, $B_{1,8}$, $B_{1,12}$ are 1, and then the rest are 0. The entries for code 2 ($D_2$) $B_{2,1}$, $B_{2,5}$, $B_{2,9}$, $B_{2,13}$ are 1, and the rest are 0. The rest of the code ($D_3$ to $D_F$) follows the same construction as equation 4.

It is worth mentioning that, code 0 ($D_0$) and code F ($D_F$), code 1 ($D_1$) and code E ($D_E$), code 2 ($D_2$) and code D ($D_D$), code 3 ($D_3$) and code C ($D_C$), code 4 ($D_4$) and code B ($D_B$), code 5 ($D_5$) and code A ($D_A$), code 6 ($D_6$) and code 9 ($D_9$), code 7 ($D_7$) and code 8 ($D_8$) have their "0" and "1" in opposite position.

Furthermore, the similarity concept is introduced. If a code $S_k$ comprises n digits $S_k=(B_{k,0}, B_{k,1}, \ldots B_{K,n-1})$, the sum of Logical nonequivalence of the corresponding $B_{k,i}$ can be calculated as equation 5. K is the code value, n is the symbol length, and m is the number of codes.

$$B_{k,i} \oplus B_{1,j} = \begin{cases} 0 & (B_{k,i} = B_{1,j}) \\ 1 & (B_{k,i} \neq B_{1,j}) \end{cases}$$ [Equation 5]

$i, j = 0, 1, 2, \ldots, n-1,$
$k, l = 0, 1, 2, \ldots, m-1.$ $$d(S_k, S_l) = \sum_{i=0}^{n-1} (B_{k,i} \oplus B_{1,j})$$ [Equation 6]

Equation 6 aggregates the results from equation 5, so that the distance between $S_k$ and $S_1$ can be calculated.

$$d_{min} = \min d(S_k, S_1)$$ [Equation 7]

After their distance has been calculated, equation 7 takes out the minimum distance between $S_k$ and $S_1$.

$$A_{max} = \frac{n - d_{min}}{n}$$ [Equation 8]

The maximum similarity value between $S_k$ and $S_1$ can be calculated by substituting results from equation 7 into equation 8.

The higher the similarity value between the codes, the harder it would be to detect the codes. On the other hand, the lower the similarity value between the codes, the easier it would be to detect the codes.

Equation 9 below shows an example of calculating the distance between codes.

$$D_2: \begin{matrix} 0 & 1 & 0 & 0 \\ 0 & 1 & 0 & 0 \\ 0 & 1 & 0 & 0 \\ 0 & 1 & 0 & 0 \end{matrix}$$ [Equation 9]

$$D_3: \begin{matrix} 1 & 1 & 0 & 0 \\ 1 & 1 & 0 & 0 \\ 1 & 1 & 0 & 0 \\ 1 & 1 & 0 & 0 \\ 1 & 0 & 0 & 0 \\ 1 & 0 & 0 & 0 \\ 1 & 0 & 0 & 0 \\ 1 & 0 & 0 & 0 \end{matrix}$$

(1) $B_{2,1} \oplus B_{3,1}$ (2) $d(D_2, D_3) = \sum_{l=0}^{15} (B_{2,1} \oplus B_{3,1}) = 4$ For example, the method of calculating the distance between code 2 ($D_2$) and code 3 ($D_3$) is showed below.

(1) Calculate the Logical nonequivalence between $2(D_2)$ and $3(D_3)$ according to equation 5.

(2) Sum the results from equation 5 to get the distance between $2(D_2)$ and $3(D_3)$. The distance in this case between $2(D_2)$ and $3(D_3)$ is 4.

Equation 10 clearly lists the distance between the codes in a determinant According to equation 8, it is calculated that the maximum similarity value is ¾.

present invention is to provide a method for generating information embedding codes with high performance to resist attacks and stochastic noises so as to improve the encoding-detecting efficiency of conventional code.

Another object of the present invention is to provide a special information embedding code so as to guarantee no loss in the quality of the information embedded images.

Another object is to provide a new information embedding code to embed a great deal of information into printed media.

Accordingly, to achieve the objects mentioned above, the present invention provide a method for generating an information embedding halftone screen code wherein the method is oriented to encode information into a type of recording forms to be printed on media, wherein the recording forms are selected from images, texts, symbols, background, and so on. The content printed on the media comprises at least a pixel, and according to the method above, can be replaced by halftone dots with different morphology arranged by a predetermined array, which forms the information embedding halftone screen code and a maximum similarity between codes is under ½ according to the predetermined array.

Another method of generating a halftone screen code is adapted to embed information into a type of printed media with content selected from images, texts, symbols, background, and so on. The media content comprises at least 1 pixel, and is capable of being replaced by a predetermined array of halftone screen code, wherein a maximum similarity value calculated between codes is lower than ¼.

[Equation 10]

|       | $D_0$ | $D_1$ | $D_2$ | $D_3$ | $D_4$ | $D_5$ | $D_6$ | $D_7$ | $D_8$ | $D_9$ | $D_A$ | $D_B$ | $D_C$ | $D_D$ | $D_E$ | $D_F$ |
|-------|---|---|---|---|---|---|---|---|---|---|---|---|---|---|---|---|
| $D_0$ |   | 4 | 4 | 8 | 4 | 8 | 8 | 12| 4 | 8 | 8 | 12| 8 | 12| 12| 16|
| $D_1$ | 4 |   | 8 | 4 | 8 | 4 | 12| 8 | 8 | 4 | 12| 8 | 12| 8 | 16| 12|
| $D_2$ | 4 | 8 |   | 4 | 8 | 12| 4 | 8 | 8 | 12| 4 | 8 | 12| 16| 8 | 12|
| $D_3$ | 8 | 4 | 4 |   | 12| 8 | 8 | 4 | 12| 8 | 8 | 4 | 16| 12| 12| 8 |
| $D_4$ | 4 | 8 | 8 | 12|   | 4 | 4 | 8 | 8 | 12| 12| 16| 4 | 8 | 8 | 12|
| $D_5$ | 8 | 4 | 12| 8 | 4 |   | 8 | 4 | 12| 8 | 16| 12| 8 | 4 | 12| 8 |
| $D_6$ | 8 | 12| 4 | 8 | 4 | 8 |   | 4 | 12| 16| 8 | 12| 8 | 12| 4 | 8 |
| $D_7$ | 12| 8 | 8 | 4 | 8 | 4 | 4 |   | 16| 12| 12| 8 | 12| 8 | 8 | 4 |
| $D_8$ | 4 | 8 | 8 | 12| 8 | 12| 12| 16|   | 4 | 4 | 8 | 4 | 8 | 8 | 12|
| $D_9$ | 8 | 4 | 12| 8 | 12| 8 | 16| 12| 4 |   | 8 | 4 | 8 | 4 | 12| 8 |
| $D_A$ | 8 | 12| 4 | 8 | 12| 16| 8 | 12| 4 | 8 |   | 4 | 8 | 12| 4 | 8 |
| $D_B$ | 12| 8 | 8 | 4 | 16| 12| 12| 8 | 8 | 4 | 4 |   | 12| 8 | 8 | 4 |
| $D_C$ | 8 | 12| 12| 16| 4 | 8 | 8 | 12| 4 | 8 | 8 | 12|   | 4 | 4 | 8 |
| $D_D$ | 12| 8 | 16| 12| 8 | 4 | 12| 8 | 8 | 4 | 12| 8 | 4 |   | 8 | 4 |
| $D_E$ | 12| 16| 8 | 12| 8 | 12| 4 | 8 | 8 | 12| 4 | 8 | 4 | 8 |   | 4 |
| $D_F$ | 16| 12| 12| 8 | 12| 8 | 8 | 4 | 12| 8 | 8 | 4 | 8 | 4 | 4 |   |

It is seen that conventional code neglected the issue of minimizing the maximum similarity value between codes. Therefore, it tends to make incorrect recognition if the printed media are subjected to fierce attacks such as pollution and disrepair.

Moreover, the traditional watermarking embedding method would lower the original image's quality after encoding.

Finally, the storing efficiency would be low according to conventional embedding process.

SUMMARY OF THE PRESENT INVENTION

In order to solve the problems of conventional information embedding method mentioned above, a primary object of the The similarity values mentioned above are calculated from the following equations:

In halftone screen code, suppose $S_k$ to be information code, n be code length, and m be code number. The maximum similarity value can be calculated from the following equations:

$$d_{min} = min\, d(S_k, S_l)$$ [Equation 1]

$$A_{max} = \frac{n - d_{min}}{n}$$ [Equation 2]

Wherein: $d(S_k, S_l)$ is the distance between code $S_k$ and $S_l$. $k, l = 0, 1, 2, \ldots m-1$.

Said halftone screen code refers to the morphology of halftone dots with at least one of the physical characteristics in a predetermined array.

Said halftone screen code refers to the morphology of halftone dots representing at least one of the physical characteristics, wherein the morphology comprises at least two halftone dots modulated by two or more modulation modes, i.e. at least one is AM (amplitude modulation) halftone dot, also known as concentrated dots, and at least one is FM halftone dot, also known as scattered halftone dot. Said AM halftone dot refers to all the halftone dots collected together in a concentrated fashion. Said FM halftone dot is formed when at least one of the halftone dots is separated from others.

Said halftone screen code refers to the morphology of halftone dots representing at least one of the physical characteristics, wherein the morphology comprises halftone dots with different wavelengths and different spectra characteristics, including different colors, infrared rays and ultraviolet rays.

Said halftone screen code refers to the morphology of halftone dots representing at least one of the physical characteristics, wherein the morphology comprises halftone dots with different characteristics of frequencies including different grayscales.

Said halftone screen code refers to the morphology of halftone dots representing at least one of the physical characteristics, wherein the morphology comprises halftone dots with different optical characteristics including different optical polarization directions and different optical reflection characteristics.

Said halftone screen code refers to the morphology of halftone dots representing at least one of the physical characteristics, wherein the morphology comprises halftone dots with different magnetic characteristics including different magnetic field intensities and directions.

When two morphology of said halftone screen code exist, at least in one case, the numbers of the two kinds of halftone dots are equal inside one halftone screen code.

One halftone screen code comprises at least one type of halftone dots that are either odd or even numbers in quantities.

When two morphology of said halftone screen code exist, at least in one case, the two kinds of halftone dots are arrayed symmetrically inside one halftone screen code.

The said halftone screen code is segmented equally and arrayed in two dimensions, forming a two dimensional halftone screen code.

The present invention further comprises a method of generating a halftone screen code to embed information into a type of print media content which is selected from a group consisting of images, texts, symbols, and background, wherein said media content comprises at least 1 pixel, and can be replaced by a predetermined array of halftone dots with different morphology including physical and geometrical characteristics according to the information embedded method that the same pixel morphology are exchangeable. The halftone screen code of embedding information into print content is achieved as above and it includes the following steps:

Calculating a similarity value between codes;

Determining whether the similarity value is lower than a predetermined threshold value;

As for codes with similarity value under the defined threshold value, matching the array of halftone dots with any given physical, geometrical or other morphology with information storing capacity to generate the information embedded code;

Analyzing the morphology, such as grayscale, of pixels in the read image data;

For the image to be embedded with information, matching pixels with different morphology, including different grayscale, with the halftone dots of the halftone screen code generated as above according to the rule of matching the same morphology The advantage of the present invention method of halftone screen code is that the maximum similarity value can be below the threshold value. Without a parity check, the system can check and correct itself, and the decryption and storing performance of the halftone screen code can be improved. Robustness can still be maintained at a high value even though the paper is defected or polluted. Information is embedded through exchanging the same pixel morphology so that the image's quality will not be lowered. In addition, the halftone screen code is formed by extremely small halftone dots, therefore it is hard to be detected by human eyes, which makes the image embedded information to be natural. The present invention provides a method to make the maximum similarity value to be lower than the threshold value, therefore the decryption efficiency can be improved. Even though the paper is defected or polluted, robustness remains high. Also, the quality of the original image will not be lowered after embedding the information.

BRIEF DESCRIPTION OF THE DRAWINGS

FIG. 18 illustrates a sample receipt, which contains halftone screen codes embedded into the background, wherein the size of the halftone dot is extremely small.

102. picture element
301. scattered halftone dots with FM halftone screen.
302. concentrated halftone dots with AM amplitude halftone screen.
401. the first kind of optical spectrum characteristic including color
402. the second kind of optical spectrum characteristic including color
501. the first kind of frequency distribution characteristic including grayscale characteristic.
502. the second kind of frequency distribution characteristic including grayscale characteristic.
601. the first kind of optical characteristic including the angles of reflection and polarization.
602. the second kind of optical characteristic including the angle of reflection and polarization.
701. the first kind of magnetic characteristic including the magnetic direction and intensity.
702. the second kind of magnetic characteristic including the magnetic direction and intensity.

DETAILED DESCRIPTION OF THE PREFERRED EMBODIMENT

The detailed embodiment of this invention will be introduced referring to the figures provided in the following. In additional, all the information embedding codes are recorded as bar halftone screen codes except two dimensional halftone screen code in this embodiment.

First of all, it is worth defining all the terms in this embodiment.

Figure 1:
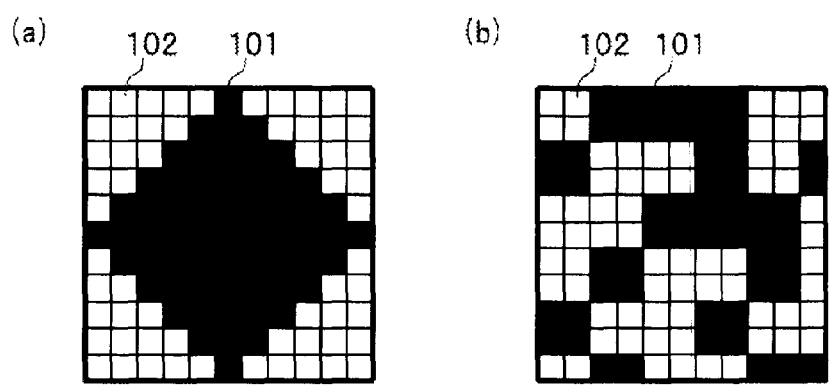
FIG. 1 is a sketch map showing an embodiment of AM and FM halftone screen. (a) An example of an AM halftone screen. (b) An example of a FM halftone screen.

FIG. 1 is a sketch map showing an implementation of AM and FM halftone screen.
(a) An example of an AM halftone screen. (b) An example of a FM halftone screen.

Dot 101 is the smallest printing unit which is a kind of color printed on picture element 102. Halftone dot is the smallest unit of an image. The AM halftone screen given in FIG. 1(a) represents the grayscale by the size of the halftone dots. The FM halftone screen given in FIG. 1(b) represents the grayscale based on the density of the halftone dots. In this embodiment, AM and FM halftone screen are defined as a method of generating halftone dots with different modulations.

The definition of halftone screen code: at least one of the forms (image, text, symbol and background) is targeted to be printed onto the recordable media, wherein the printed content comprises at least one pixel, and can be replaced by a predetermined array of halftone dots with different morphology including physical and geometrical characteristics according to the information embedded method that the same pixel morphology are exchangeable. The halftone screen code of embedding information into print content is achieved as above. The characteristic of this embedding information method is that the calculated maximum similarity value between codes is lower than the threshold value.

Figure 2:
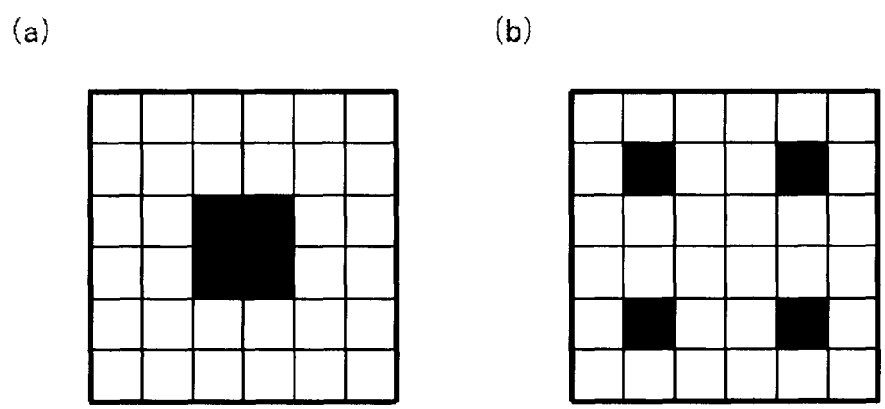
FIG. 2 is a sketch map showing an embodiment of using halftone dots. (a) An example of a concentrated halftone screen. (b) An example of a scattered halftone screen.

FIG. 2 is an embodiment of halftone dots used. (a) An example of a concentrated halftone screen. (b) An example of a scattered halftone screen.

As shown in FIG. 2(a), so-called concentrated halftone dot refers to that all the dot-matrix within a halftone dot is concentrated at one point. As shown in FIG. 2(b), so-called scattered halftone dot means that at least one bit of the dot-matrix within a halftone dot is separated from the others.

In addition, concentrated halftone dots can be grouped as a kind of AM halftone screen and scattered halftone screen can be grouped as a kind of FM halftone screen. In this embodiment, concentrated halftone dots are considered to be generated by AM halftone screen and scattered halftone dots are generated by FM halftone screen.

Figure 3:
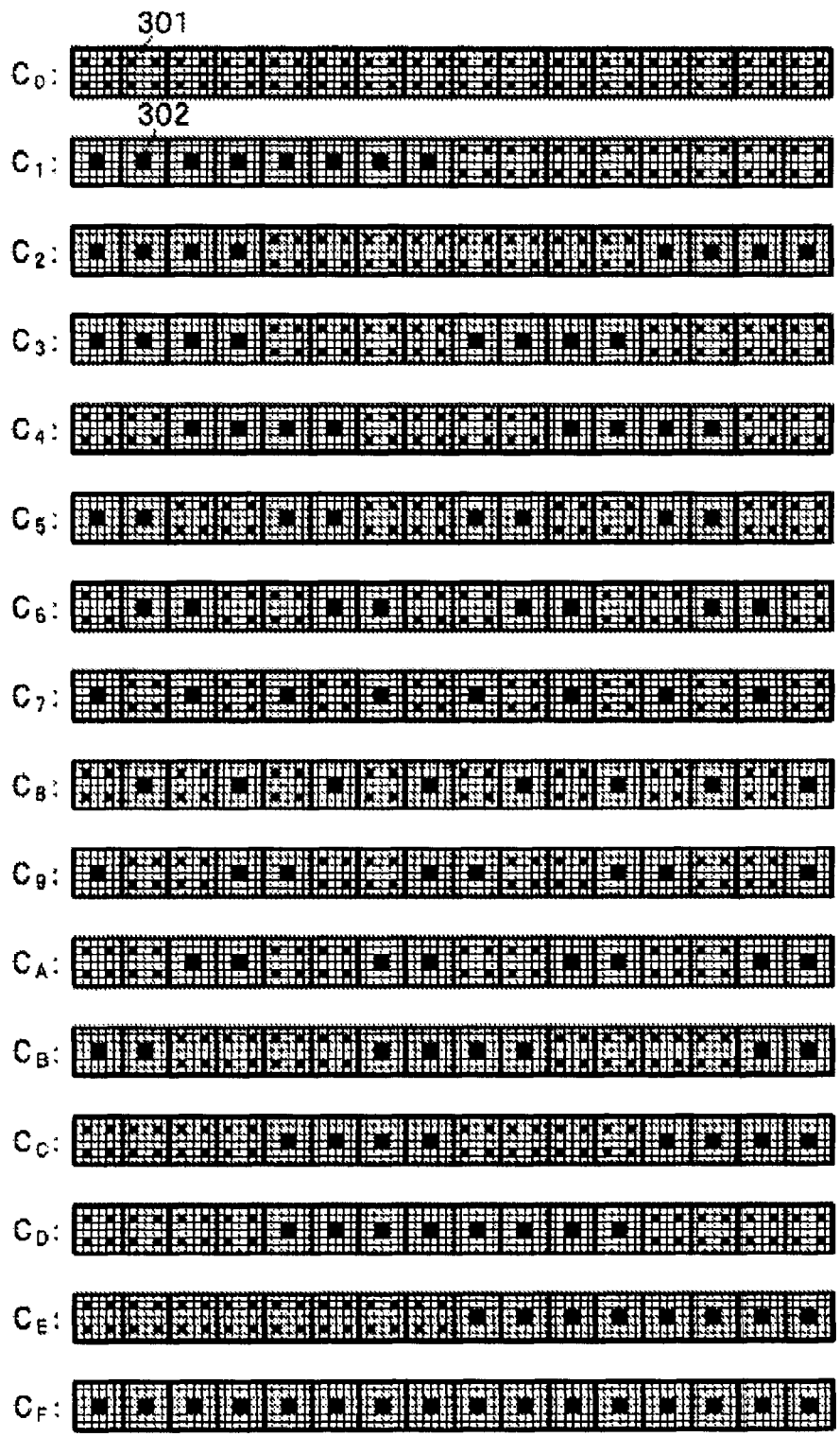
FIG. 3 is an example of bar halftone screen code based on a hexadecimal system composed of concentrated and scattered halftone dots.

As shown in FIG. 3, a hexadecimal bar halftone screen code can be generated by concentrated halftone dots and scattered halftone dots In FIG. 3, 301 represent scattered halftone dots, and 302 represents concentrated halftone dots. In addition, $C_n$ represents the code value. When scattered and concentrated halftone_dots are grouped together, the consistent grayscale can be obtained, and code value could be represented as well.

Here, the code value $C_k$, $C_0$ to $C_{m-1}$ (m is the number of the codes, supposed to be 16) is defined as an assembly of halftone screen code arrayed as a predetermined order. The characteristic of this assembly of halftone screen code is that the maximum similarity value is guaranteed to be under the threshold value while describing the grayscale.

In this embodiment $B_{i,k}$ represents the $K^{th}$ bit of code i.

As shown in FIG. 3, all the halftone dots of code 0 (C0) are formed by scattered halftone dots. $B_{1,0}$, $B_{1,1}$, $B_{1,2}$, $B_{1,3}$, $B_{1,4}$, $B_{1,5}$, $B_{1,6}$, $B_{1,7}$ are formed by concentrated halftone dots. $B_{1,8}$, $B_{1,9}$, $B_{1,10}$, $B_{1,11}$, $B_{1,12}$, $B_{1,13}$, $B_{1,14}$, $B_{1,15}$ are formed by scattered halftone dots. Also, $B_{2,0}$, $B_{2,1}$, $B_{2,2}$, $B_{2,3}$, $B_{2,12}$, $B_{2,13}$, $B_{2,14}$, $B_{2,15}$ from code 2 ($C_2$) are concentrated halftone dots. $B_{2,4}$, $B_{2,5}$, $B_{2,6}$, $B_{2,7}$, $B_{2,8}$, $B_{2,9}$, $B_{2,10}$, $B_{2,11}$ are formed by scattered halftone dots. From code 3 ($C_3$) to code F ($C_F$) as shown in FIG. 3, are formed by concentrated and scattered halftone dots. Also, in code 0 ($C_0$) and code F ($C_F$), code 1 ($C_1$) and code E ($C_E$), code 2 ($C_2$) and code D ($C_D$), code 3 ($C_3$) and code C ($C_C$), code 4 ($C_4$) and code B ($C_B$), code 5 ($C_5$) and code A ($C_A$), code 6 ($C_6$) and code 9 ($C_9$), and code 7 ($C_7$) and code 8 ($C_8$), the scattered halftone dots are in the reciprocal position to concentrated halftone dots.

As shown in FIG. 3, the numbers of scattered halftone dots and the concentrated halftone dots are the same. As a result, the parity check could be conveniently achieved without parity bit, realizing high efficient recording.

Accordingly, the maximum similarity value between the codes of the halftone screen code shown in FIG. 3 is calculated in the following. First of all, suppose Ck to be the code value of the bar halftone screen code, and suppose the bits of Ck as all elements. Here, the bits are formed by concentrated and scattered halftone dots. Then, suppose the total number of bits as the length of the code. FIG. 3 indicates that the code length of this example is 16.

Figures 4, 5:
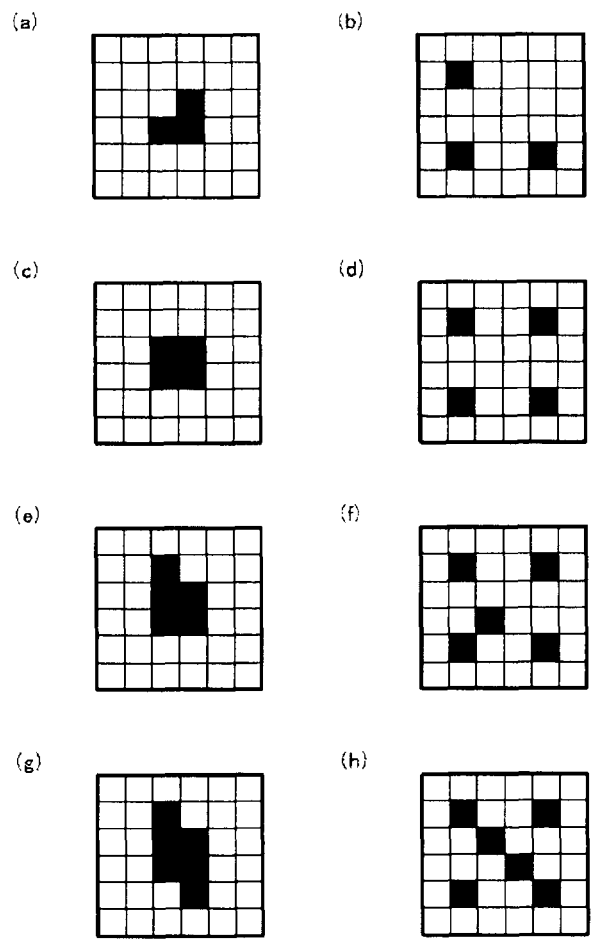
FIG. 4 is a method of calculating the maximum similarity value of bar halftone screen code given the embodiment
FIG. 5 is a graphical representation of the relationship of the grayscale and distribution of the halftone dots.

FIG. 4 shows the calculation method of calculating the maximum similarity value between the bar halftone screen. An example of calculating the distance between the codes from the halftone screen code is further illustrated in FIG. 4. The calculation is to obtain the distance between 4 ($C_4$) and 5 ($C_5$).

(1) First of all, a logical nonequivalence sum between codes is calculated according to [Equation 5].
(2) Afterwards, logical nonequivalence sums are added up to obtain a distance between the codes in this claim according to the [Equation 6].

The distance between code 4 ($C_4$) and code 5 ($C_5$) in the example above is calculated as 8.

As shown in Equation 11, the distance between codes in FIG. 3 can be calculated. The minimum distance is found from all the data of distance between codes. And then, the maximum similarity value can be calculated according to [Equation 6]. FIG. 3 shows the maximum similarly value between the codes of the bar halftone screen code to be ½.

| | $C_0$ | $C_1$ | $C_2$ | $C_3$ | $C_4$ | $C_5$ | $C_6$ | $C_7$ | $C_8$ | $C_9$ | $C_A$ | $C_B$ | $C_C$ | $C_D$ | $C_E$ | $C_F$ | |
|---|---|---|---|---|---|---|---|---|---|---|---|---|---|---|---|---|---|
| $C_0$ |   | 8 | 8 | 8 | 8 | 8 | 8 | 8 | 8 | 8 | 8 | 8 | 8 | 8 | 8 | 16 | [Equation 11] |
| $C_1$ | 8 |   | 8 | 8 | 8 | 8 | 8 | 8 | 8 | 8 | 8 | 8 | 8 | 8 | 16 | 8 | |
| $C_2$ | 8 | 8 |   | 8 | 8 | 8 | 8 | 8 | 8 | 8 | 8 | 8 | 8 | 16 | 8 | 8 | |
| $C_3$ | 8 | 8 | 8 |   | 8 | 8 | 8 | 8 | 8 | 8 | 8 | 8 | 16 | 8 | 8 | 8 | |
| $C_4$ | 8 | 8 | 8 | 8 |   | 8 | 8 | 8 | 8 | 8 | 8 | 16 | 8 | 8 | 8 | 8 | |
| $C_5$ | 8 | 8 | 8 | 8 | 8 |   | 8 | 8 | 8 | 8 | 16 | 8 | 8 | 8 | 8 | 8 | |
| $C_6$ | 8 | 8 | 8 | 8 | 8 | 8 |   | 8 | 8 | 16 | 8 | 8 | 8 | 8 | 8 | 8 | |
| $C_7$ | 8 | 8 | 8 | 8 | 8 | 8 | 8 |   | 16 | 8 | 8 | 8 | 8 | 8 | 8 | 8 | |
| $C_8$ | 8 | 8 | 8 | 8 | 8 | 8 | 8 | 16 |   | 8 | 8 | 8 | 8 | 8 | 8 | 8 | |
| $C_9$ | 8 | 8 | 8 | 8 | 8 | 8 | 16 | 8 | 8 |   | 8 | 8 | 8 | 8 | 8 | 8 | |
| $C_A$ | 8 | 8 | 8 | 8 | 8 | 16 | 8 | 8 | 8 | 8 |   | 8 | 8 | 8 | 8 | 8 | |
| $C_B$ | 8 | 8 | 8 | 8 | 16 | 8 | 8 | 8 | 8 | 8 | 8 |   | 8 | 8 | 8 | 8 | |
| $C_C$ | 8 | 8 | 8 | 16 | 8 | 8 | 8 | 8 | 8 | 8 | 8 | 8 |   | 8 | 8 | 8 | |
| $C_D$ | 8 | 8 | 16 | 8 | 8 | 8 | 8 | 8 | 8 | 8 | 8 | 8 | 8 |   | 8 | 8 | |
| $C_E$ | 8 | 16 | 8 | 8 | 8 | 8 | 8 | 8 | 8 | 8 | 8 | 8 | 8 | 8 |   | 8 | |
| $C_F$ | 16 | 8 | 8 | 8 | 8 | 8 | 8 | 8 | 8 | 8 | 8 | 8 | 8 | 8 | 8 |   | |

FIG. 5 illustrates the relationship between the grayscale and the number of the dots within the halftone. dot Referring to FIG. 5(*a*) is an example of a concentrated halftone dot with a grayscale value of 3; (b) is an example of a scattered halftone dot with a grayscale value of 3; (c) is an example of a concentrated halftone dot with a grayscale value of 4; (d) is an example of a scattered halftone dot with a grayscale value of 4; (e) is an example of a concentrated halftone dot with a grayscale value of 5; (f) is an example of a scattered halftone dot with a grayscale value of 5; (g) is an example of a concentrated halftone dot with a grayscale value of 6; (h) is an example of a scattered halftone dot with a grayscale value of 6.

As shown in FIG. 5, there are 3 dots within one halftone dot when the grayscale value is 3. There are 4 dots within one halftone dot when the grayscale value is 4. There are 5 dots within one halftone dot when the grayscale value is 5. There are 6 dots within one halftone dot when the grayscale value is 6.

In this embodiment here, the grayscale value of AM halftone screen and FM halftone screen is varied correspondingly with respect to the quantity of the dots Therefore, once the quantity of the dots within halftone dot is set, the grayscale performance would be manageable.

Figure 6:
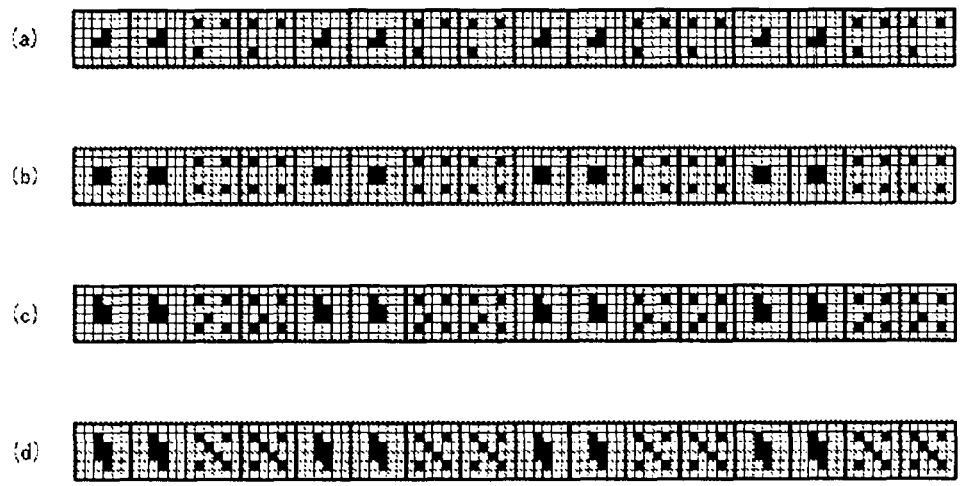
FIG. 6 is a graphical representation of code 5(C5) from FIG. 3 after the transformation step of exchanging halftone dots by using different grayscale characteristics.

As shown in FIG. 6, code 5 ($C_5$) from the bar halftone screen code in FIG. 3 can be represented as another bar halftone screen code with varied grayscale.

FIG. 6(*a*) is an example of a bar halftone screen code with a grayscale value of 3. (b) is an example of a bar halftone screen code with a grayscale value of 4. (c) is an example of a bar halftone screen code with a grayscale value of 5. (d) is an example of a bar halftone screen code with a grayscale value of 6. FIG. 6 is similar to FIG. 5, that there are 3 dots within one halftone dot when the grayscale value is 3, 4 dots within one halftone dot when the grayscale value is 4, 5 dots within one halftone dot when the grayscale value is 5, and 6 dots within one halftone dot when the grayscale value is 6.

The embodiment uses the halftone dot-matrix arraying method as shown in FIG. 2 to form the bar halftone screen code. It is not that the embodiment is not limited to this one type of bar halftone screen code. Accordingly, a bar halftone screen code could be established as long as two or more different forms of halftone dot are present. For example, halftone dot with at least two different types of geometric forms can form a bar halftone screen code, and halftone dot with at least two different types of physical forms can form a bar halftone screen code as well. In addition, not only dot halftone screen has the described characteristics, halftone screen code can also be formed by myrialine halftone screen.

Figure 7:
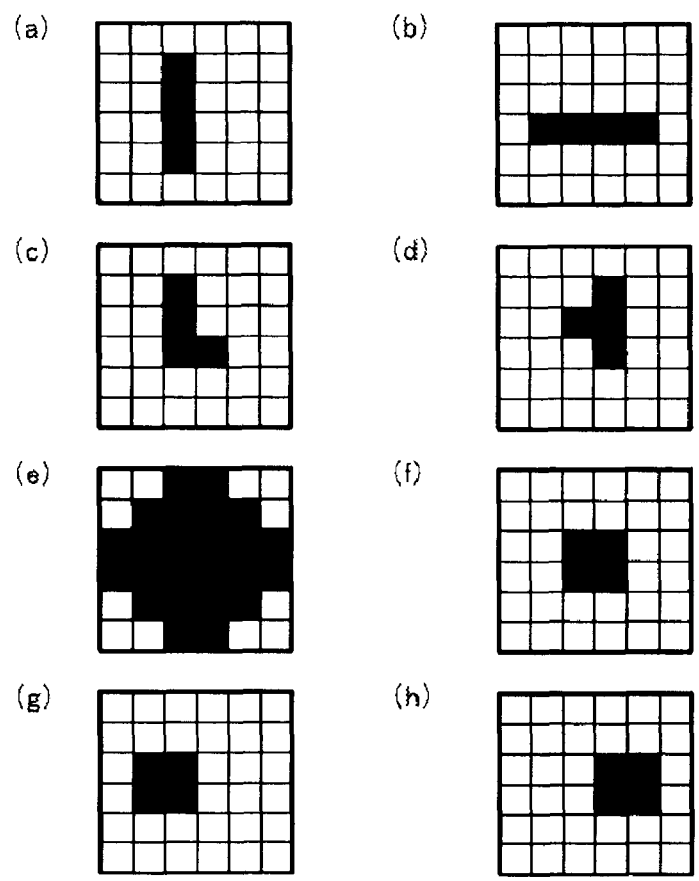
FIG. 7 is a graphical representation of different pairs of halftone dots with different geometrical characteristics.

As shown in FIG. 7, a plurality of dot geometrical distributing forms for forming the bar halftone screen code are illustrated. Example (a) and (b) utilize the dot within one graphic but consisting of dot-matrix of different directions. Example (c) utilizes the dot consisting of dot-matrix of varied shape. Example (e) and (f) utilize the dot consisting of dot-matrix of varied size, wherein the grayscale of the respective halftone dot is calculated by a mean value of neighboring dot. Example (g) and (h) utilize the dot having different positions but consisting of dot-matrix of same shape.

It is noted that except example (e), the grayscale value in above FIG. 7 are defined as 4. In fact, any grayscale value would be appropriate in this case.

As shown in FIGS. 7(*a*) and (*b*), the bar halftone screen code can be formed by the halftone dots which are made up of dot-matrix with different directions in the same graph. As shown in FIGS. 7(*c*) and (*d*), the bar halftone screen code can be formed by the halftone dots which are made up of dot-matrix with different shapes. As shown in FIGS. 7(*e*) and (*f*) the bar halftone screen code can be formed by the halftone dots which are made up of dot-matrix with different sizes. As shown in FIGS. 7(*g*) and (*h*), the bar halftone screen code can be formed by the halftone dots which are made up of dot-matrix with the same shapes but different positions.

Figure 8:
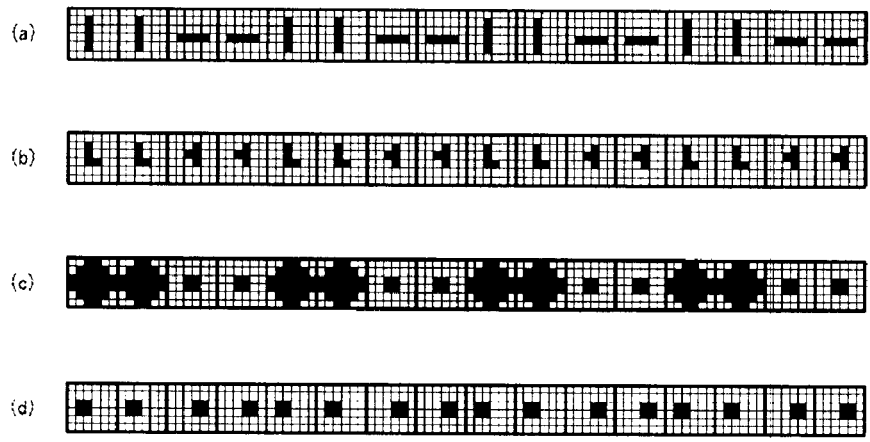
FIG. 8 is a graphical representation of halftone screen code composed of a combination of different pairs of halftone dots with different geometrical characteristics.

FIG. 8 gives examples of bar halftone screen code using halftone dots with different dot-matrix distribution as described in FIG. 7. The bar halftone screen code shown in FIG. 8(*a*) is bar halftone screen code formed by halftone dots given in FIGS. 7(*a*) and (*b*). The bar halftone screen code shown in FIG. 8(*b*) is formed by the halftone dots given in FIGS. 7(*c*) and (*d*). The bar halftone screen code shown in FIG. 8(*c*) is formed by halftone dots given in FIGS. 7(*e*) and (*f*). The bar halftone screen code shown in FIG. 8(*d*) is formed by the halftone dots given in FIGS. 7(*g*) and (*h*).

The code values of the bar halftone screen code in all the examples are set to be 5 ($C_5$).

The bar halftone screen code shown in FIG. 8(*a*) is formed by halftone dots which are made up of dot-matrix with different directions in the same graph. The bar halftone screen code shown in FIG. 8(b) is formed by halftone dots which are made up of dot-matrix with different shapes. The bar halftone screen code shown in FIG. 8(c) is formed by halftone dots which are made up of dot-matrix with different sizes. The bar halftone screen code shown in FIG. 8(d) is formed by halftone dots which are made up of dot-matrix with different the same shapes but different positions.

The bar halftone screen code shown in FIG. 8(a) is formed by halftone dots which are made up of dot-matrix with different directions in the same graph. The bar halftone screen code shown in FIG. 8(b) is formed by halftone dots which are made up of dot-matrix with different shapes. The bar halftone screen code shown in FIG. 8(c) is formed by halftone dots which are made up of dot-matrix with different sizes. The bar halftone screen code shown in FIG. 8(d) is formed by halftone dots which are made up of dot-matrix with different the same shapes but different positions.

Figure 9:
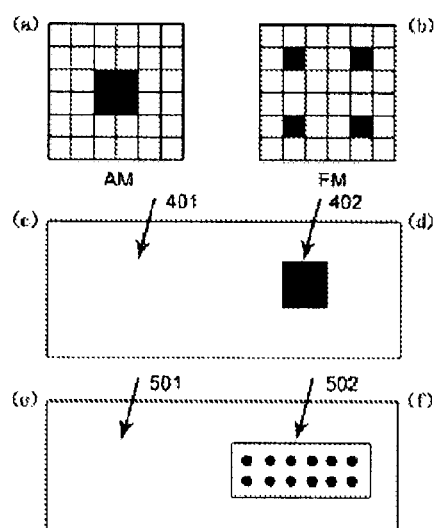
FIG. 9 is a graphical representation of different pairs of halftone dots with different physical properties.
Figure 9:
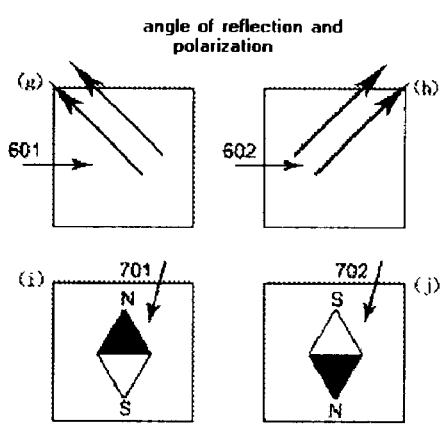

In addition, FIG. 9 gives examples of morphology of halftone dots with different physical properties. In fact, there are more than the types of morphology listed, i.e. the similar morphology are also included.

Figure 10:
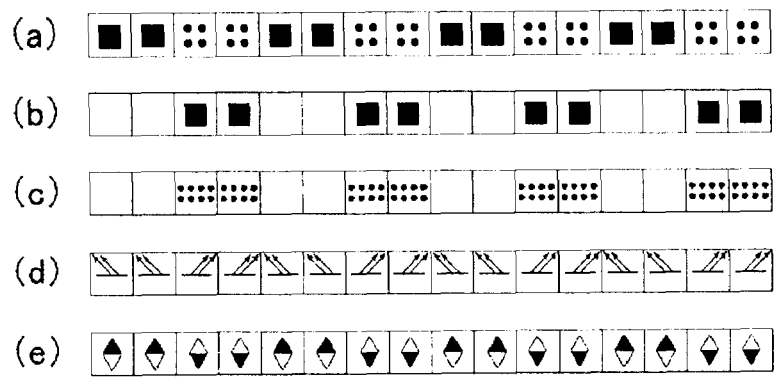
FIG. 10 is a graphical representation of halftone screen code composed of different pairs of halftone dots with different physical properties.

FIG. 10 shows an example of halftone screen code formed by halftone_dots which are composed by different physical morphology shown in FIG. 9. FIG. 10(a) is a bar halftone screen code formed by halftone dots shown in FIGS. 9(a) and (b). FIG. 10(b) is a bar halftone screen code formed by halftone_dots shown in FIGS. 9(c) and (d). FIG. 10(c) is a bar halftone screen code formed by halftone_dots shown in FIGS. 9(e) and (f). FIG. 10(d) is a bar halftone screen code formed by halftone_dots shown in FIGS. 9(g) and (h). FIG. 10(e) is a bar halftone screen code formed by halftone_dot shown in FIGS. 9(i) and (j).

The code values of the bar halftone screen code in all the examples here are also set to be 5 ($C_5$).

FIG. 10(a) is a bar halftone screen code formed by using different modulations of AM halftone screen and FM halftone screen. The characteristic of this formation is that even the array of respective halftone dots is varied, the grayscale would be same and the whole code would not be affected. When information is embedded into the target image, the halftone dots with different grayscale values can be exchanged selectively according to the grayscale of the target image so as to ensure that the overall quality of the target image would not be affected after such embedding process.

FIG. 10(b) is a bar halftone screen code formed by a set of assembled halftone dots having different wavelength and varied spectrum characteristics, such as different colors, infrared rays and ultraviolet rays. For example, (c) 401 of the FIG. 9(c) is light blue (d) 402 is printed with tiny halftone dots of green according to the permutation and combination of the halftone screen codes. According to the arrangement given by FIG. 10(b), information can be embedded into the image obviating the naked-eye recognition. This is one of the methods for embedding information into colored target images.

FIG. 10(c) is a bar halftone screen code formed by an array of halftone dots with different frequency properties, including different grayscale values. For example, (e) 501 in FIG. 9(e) is a portion of the text in a binary image and at a location of (f) 502, a halftone dot with a grayscale value smaller than that of 501 is set. According to the permutation and combination from FIG. 10(c), information can be embedded obviating the possibility being recognized by human naked eyes. This is one of the methods for embedding information in binary image such as text image.

FIG. 10(d) is a bar halftone screen code formed by an array of halftone dots with different angles of polarization and deflection. For example, 601 in FIG. 9(g) is a halftone dot that is deflected or polarized to the left And 602 in FIG. 9(h) is a halftone dot that is deflected or polarized to the right. According to the permutation and combination of FIG. 10(d), information can be embedded for laser anti-counterfeiting label.

FIG. 10(e) is a bar halftone screen code formed by an array of halftone dots with different magnetic intensities and different magnetic directions. For example, 701 and 702 in FIG. 9(i) and (j) are halftone dots with different magnetic directions. According to the permutation and combination of FIG. 10(e), information can be embedded for magnetic ink printing purposes.

Figure 11:
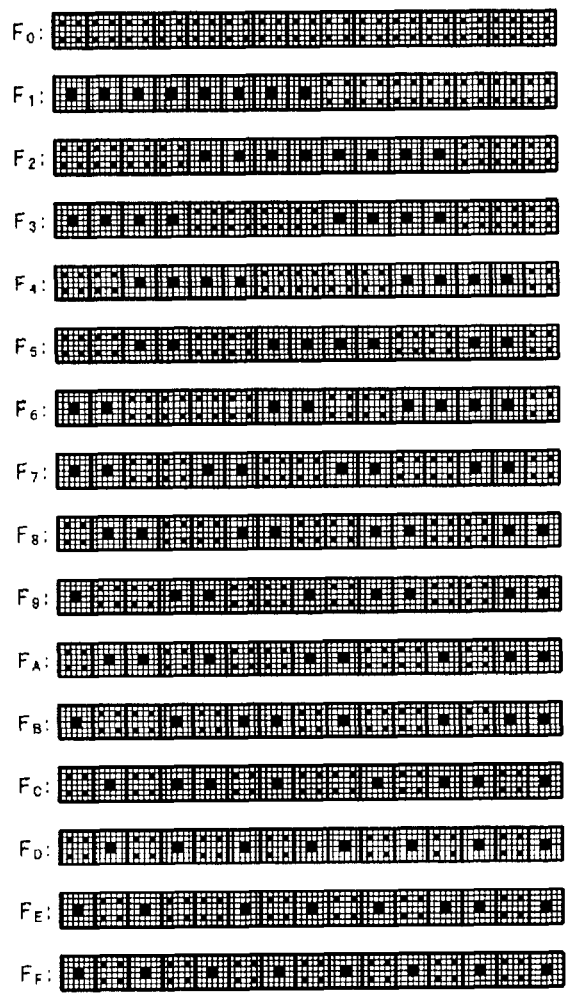
FIG. 11 is an example of a bar halftone screen code with a code length of 15.

FIG. 11 is a bar halftone screen code with a code length of 15.

As shown in FIG. 11, all the halftone dots from code 0 ($F_0$) are scattered. $B_{1,0}$, $B_{1,1}$, $B_{1,2}$, $B_{1,3}$, $B_{1,4}$, $B_{1,5}$, $B_{1,6}$, $B_{1,7}$ from code 1 ($F_1$) are formed by concentrated halftone dots $B_{1,8}$, $B_{1,9}$, $B_{1,10}$, $B_{1,11}$, $B_{1,12}$, $B_{1,13}$, $B_{1,14}$ are formed by scattered halftone dots. $B_{2,0}$, $B_{2,1}$, $B_{2,2}$, $B_{2,3}$, $B_{2,12}$, $B_{2,13}$, $B_{2,14}$ from code 2 ($F_2$) are formed by scattered halftone dots $B_{2,4}$, $B_{2,5}$, $B_{2,6}$, $B_{2,7}$, $B_{2,8}$, $B_{2,9}$, $B_{2,10}$, $B_{2,11}$ are formed by concentrated halftone dots from code 3 ($F_3$) to code F ($F_F$) as shown in FIG. 11, the maximum similarity value of halftone screen code is $7/15$ (<$1/2$).

Figure 12:
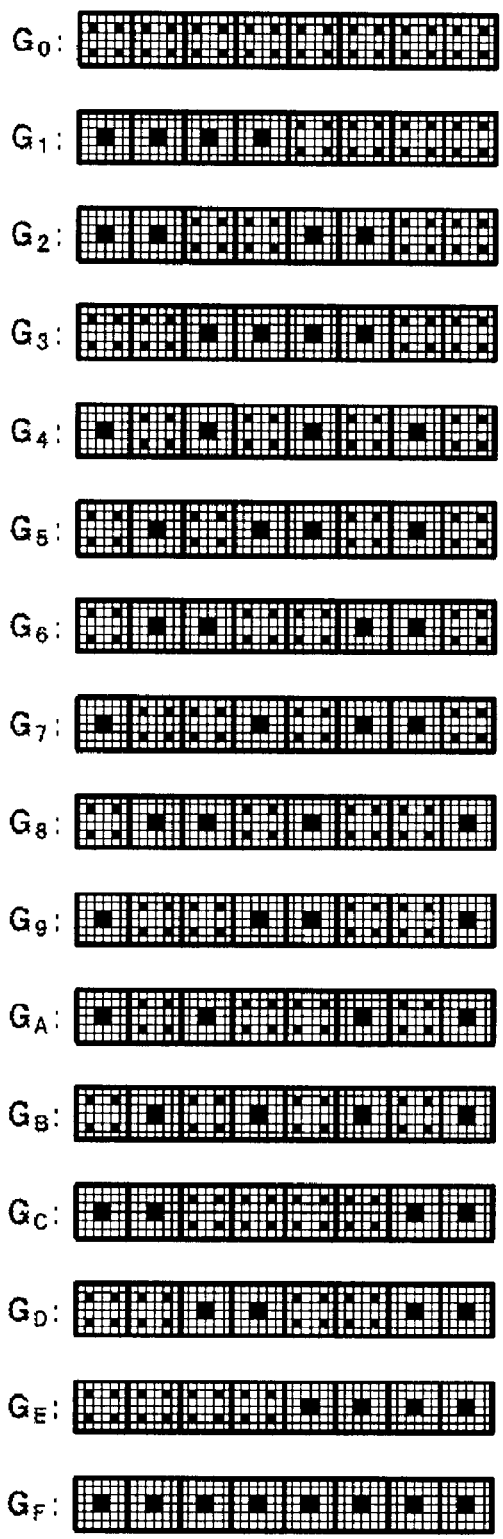
FIG. 12 is the first example of a bar halftone screen code with a code length of 8.

FIG. 12 is an example of a bar halftone screen code with a code length of 8.

The bar halftone screen code is shown in FIG. 12. All the halftone dots from code 0 ($G_0$) are formed by scattered halftone dots Code ($G_1$) is formed by concentrated halftone dots $B_{1,0}$, $B_{1,1}$, $B_{1,2}$, $B_{1,3}$ and scattered halftone dots $B_{1,4}$, $B_{1,5}$, $B_{1,6}$, $B_{1,7}$. Code ($G_2$) is formed by concentrated halftone dots $B_{2,0}$, $B_{2,1}$, $B_{2,4}$, $B_{2,5}$ and scattered half tone dots $B_{2,2}$, $B_{2,3}$, $B_{2,6}$, $B_{2,7}$. Code 3 ($G_3$) to code F ($G_F$) are formed as shown in FIG. 12. The maximum similarity value of the bar halftone screen code is $1/2$.

Figure 13:
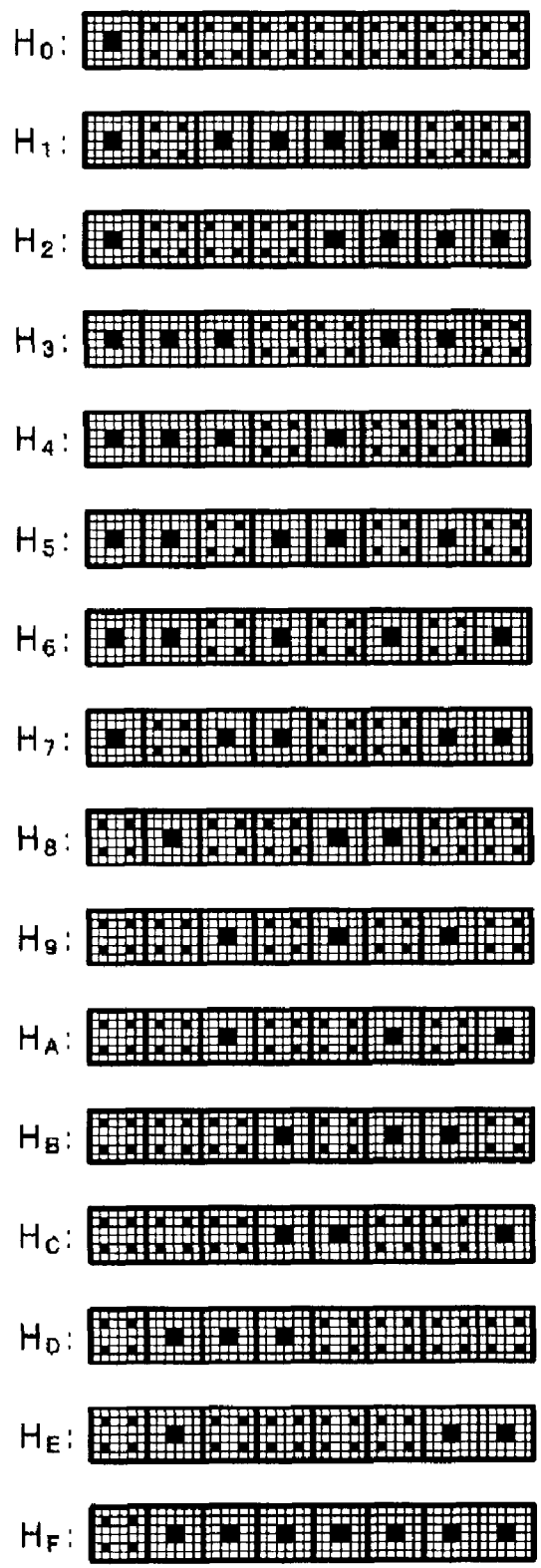
FIG. 13 is the second example of a bar halftone screen code with a code length of 8.

FIG. 13 is a bar halftone screen code with a code length of 8.

The difference between the bar halftone screen code in FIG. 13 and FIG. 12 is that the quantities of the concentrated halftone dots are defined as odd numbers.

As shown in FIG. 13, only $B_0$ from code 0 ($H_0$) is a concentrated halftone dot the rest are all scattered halftone dots. $B_{1,0}$, $B_{1,2}$, $B_{1,3}$, $B_{1,4}$, $B_{1,5}$ from code 1 ($H_1$) are formed by concentrated halftone dots. $B_{1,1}$, $B_{1,6}$, $B_{1,7}$ are formed by scattered halftone dots $B_{2,0}$, $B_{2,4}$, $B_{2,5}$, $B_{2,6}$, $B_{2,7}$ from code 2 ($H_2$) are formed by concentrated halftone dots $B_{2,1}$, $B_{2,2}$, $B_{2,3}$ are formed by scattered halftone dots. Code 3 ($H_3$) to code F ($H_F$) are formed as shown by FIG. 13. The maximum similarity value of the bar halftone screen code is $1/2$.

Figure 14:
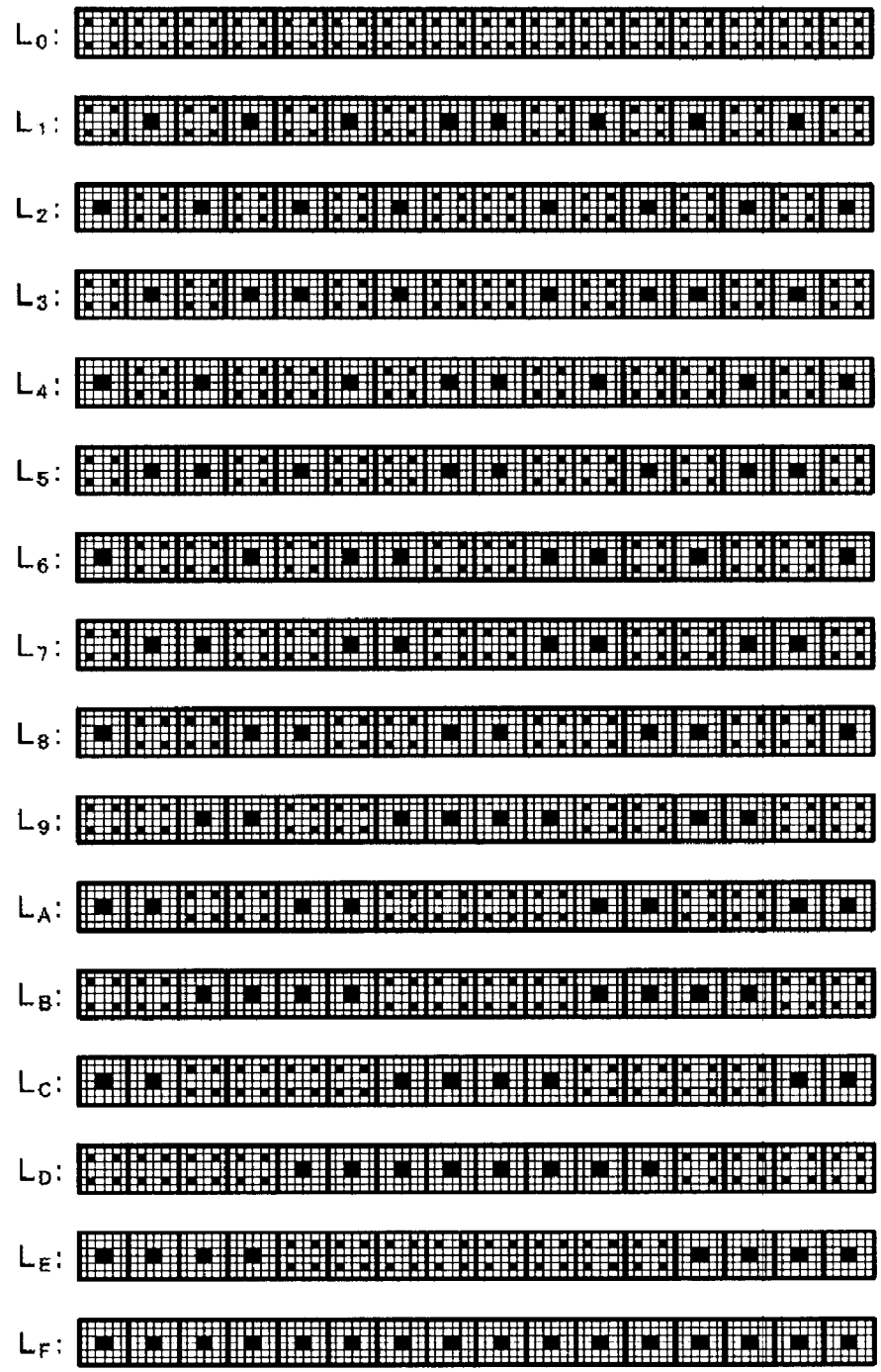
FIG. 14 is an example of a symmetrical bar halftone_ screen code with a code length of 16.

FIG. 14 is a bar halftone screen code with a code length of 16.

The difference between the bar halftone screen code from FIG. 14 and FIG. 3 is that the concentrated and scattered halftone -dots are distributed symmetrically.

As shown in FIG. 14, code 0 ($L_0$) are formed by scattered halftone dots. $B_{1,1}$, $B_{1,3}$, $B_{1,5}$, $B_{1,7}$, $B_{1,8}$, $B_{1,10}$, $B_{1,12}$, $B_{1,14}$ from code 1 ($L_1$) are formed by concentrated halftone dots. $B_{1,0}$, $B_{1,2}$, $B_{1,4}$, $B_{1,6}$, $B_{1,9}$, $B_{1,11}$, $B_{1,13}$, $B_{1,15}$ are formed by scattered halftone dots $B_{2,0}$, $B_{2,2}$, $B_{2,4}$, $B_{2,6}$, $B_{2,9}$, $B_{2,11}$, $B_{2,13}$, $B_{2,15}$ from code 2 ($L_2$) are formed by concentrated halftone dots. $B_{2,1}$, $B_{2,3}$, $B_{2,5}$, $B_{2,7}$, $B_{2,8}$, $B_{2,10}$, $B_{2,12}$, $B_{2,14}$ are formed by scattered halftone dots Code 3 ($L_3$) to code F ($L_F$) are formed as shown by FIG. 14. The code can still be decrypted even though the paper is inverted with a 180°. The maximum similarity value of the bar halftone screen code is $1/2$.

Here, the information embedded into paper will be susceptible to two types of noise interference. The first kind of noise refers to pollution or defect on paper which can cause concentrated errors of halftone dots on a large area. Such errors are known as paroxysmal errors. The second type of noise refers to the pollution from the printer drum or tiny deformation of paper due to heat, or optical quantum effects of scanner, which causes random independent errors. Such errors are referred as random errors.

In reality, it is easy to have large area pollution on the paper. Therefore, the probability of the first type of paroxysmal noise is far more likely to happen than the second type of random errors. Also, the polluted dots on the blank paper are usually treated as concentrated halftone dots. Therefore, whenever the errors happened, the probability of converting concentrated halftone dots to scattered halftone dots is far lower than the probability of converting scattered halftone dots to concentrated halftone dots As a result, it is better to have more concentrated halftone dots in bar halftone screen code.

Figure 15:
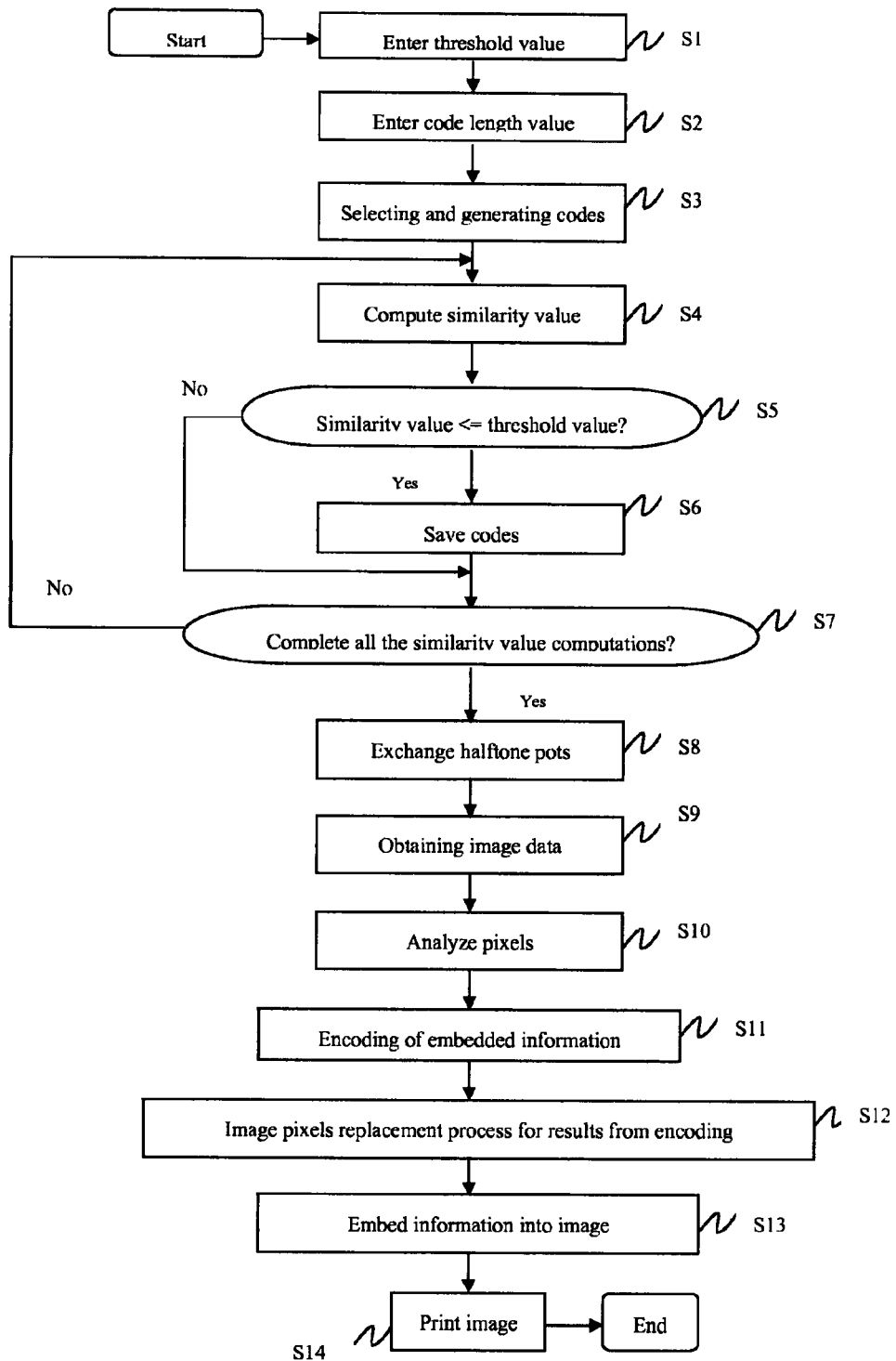
FIG. 15 is a process flow graph of the process method to compose halftone screen code according to the embodiment

FIG. 15 is a process flow chart according to the method of generating halftone screen code of the present invention. The method comprises the following steps:

(S1) inputting a threshold value;
(S2) inputting a code length value;
(S3) selecting and generating a plurality of codes by gauging the code lengths of same value;
(S4) calculating similarity values between the plurality of codes, wherein the similarity is expressed as (n−d)/n, suppose d to be a distance and n to be the code length.
(S5) determining whether the similarity is lower than the threshold value, wherein a typical threshold values is ½, even ¼. If the similarity value is higher than the threshold value (S5→no), the process is switched to (S7). If the similarity value is smaller than the threshold value (S5→yes), then turn to (S6).
(S6) saving the codes with the similarity value lower than the threshold value;
(S7) determining whether the similarity comparison is completed, if it is not completed (S7→no), then go back to (S4). If all the comparisons are completed (S7→yes), then send the codes with a similarity value smaller than the threshold value as a second group to (S8) to replace halftone dots. Up until now, all bits of codes are still "0" or "1" in a binary system.
(S8) exchanging the binary code with halftone dots according to different morphology of the halftone dots to form a halftone screen code.

In this embodiment, concentrated AM halftone dots and scattered FM halftone dots as shown in FIG. 2 are the main sources of halftone dots It is not only limited to this type of halftone dots As shown in FIG. 7(*a*) to (*h*), many halftone dots with different geometric characteristics can also form halftone screen code. As shown in FIG. 9(*c*) to (*j*), many halftone dots with different physical characteristics can also form halftone screen code.

(S9) recording a target image via a scanning means to obtain an image data;
(S10) analyzing the image data to obtain a pixel analysis.
(S11) sending the pixel analysis into a message embedded code.

During the pixel analyzing process (S10), all morphology of pixels including its grayscale are analyzed and the result is sent to the encoding process (S11). In this embodiment the grayscale analyzing process is carried out by representing the grayscale with its pixel intensity. It is not only limited to analyzing the grayscale, it is also appropriate to analyze different morphology of colors, angles of polarization, or magnetic properties.

(S11) embedding a predetermined information according to the rules of the halftone screen code
(S12) replacing pixel characteristic data obtained from (S10) from encoded information
(S13) using the result obtained from S11 to exchange with pixels from the image data to arrive the aim of embedding information.
(S14) printing the information embedded image.

A common application of the halftone screen code is listed below, wherein the physical morphology of the halftone dots of the present invention comprise different colors, i.e. different spectra, or different grayscales, i.e. different frequencies Suppose n kinds of colors $c_1, c_2, \ldots, c_n$ to be a set of color distribution of neighboring pixels in a given image, and $o_1, o_2, \ldots, o_m$ to be another set of color distribution opposite to $c_1, c_2, \ldots, c_n$. If $o_1, o_2, \ldots, o_m$ are embedded at a position adjacent to $c_1, c_2, \ldots, c_n$ and invisible to human eyes, embedding information into color images can be achieved by the halftone screen code with $c_1, c_2, \ldots, c_n$ representing "1" and $o_1, o_2, \ldots, o_m$ representing "2".

Accordingly, suppose a plurality of grayscale values $h_1, h_2, \ldots, h_n$ to be a grayscale distribution of neighboring pixels in a given image, and $k_1, k_2, \ldots, k_m$ is another set of grayscale values against $h_1, h_2, \ldots, h_n$. The encoding can be finished by representing $h_1, h_2, \ldots, h_n$ as "1" and $k_1, k_2, \ldots, k_m$ as "2". A special example is to set $h_1, h_2, \ldots, h_n$ to be the highest grayscale values, and $k_1, k_2, \ldots, k_m$ to have at least one type of grayscale value below the highest grayscale value. Therefore, the halftone screen code can be applied to embed information for binary image.

Figure 16:
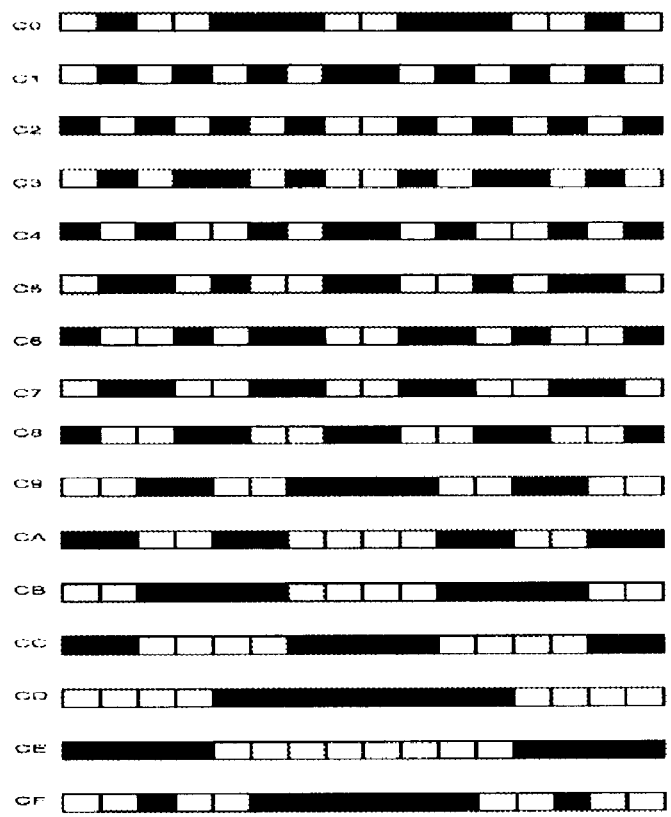
FIG. 16 is an example of a bar halftone screen code capable of forming a binary halftone screen code.
Figure 17:
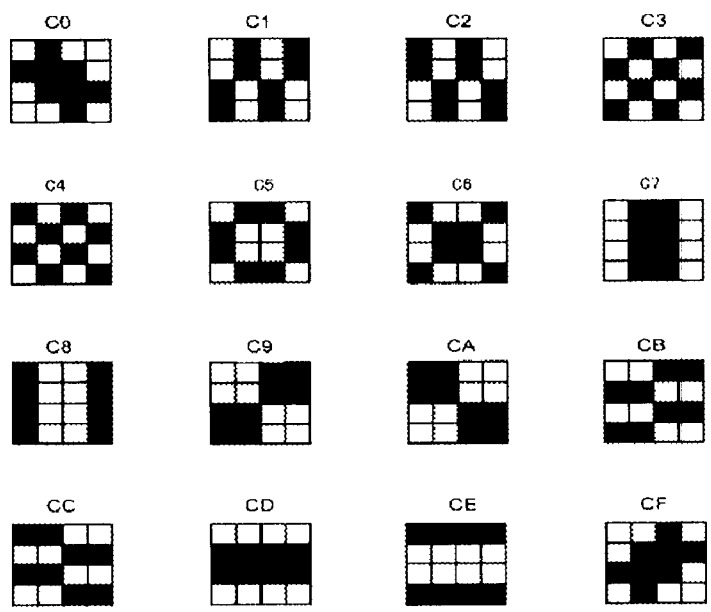
FIG. 17 is an example of a binary bar halftone screen code. 101.dot, i.e., the smallest printing unit of a dot printer.

According to the present invention, the bar halftone screen code is capable of forming a 2-dimensional halftone screen code representing more than one code inside one halftone dot. As shown in FIG. 16, a halftone screen code with a code length of 16 is divided into four sections to form a 2-dimensional halftone screen code with a 4*4 dot-matrix as shown in FIG. 17. The maximum similarity value between codes of the new 2-dimensional halftone screen code is the same as the original bar halftone screen code.

The following introduces an embodiment of the present invention.

The following embodiment shows a bar halftone screen code wherein massive information can be embedded into the background of the image.

The sample is a receipt. As shown in FIG. 18, contents, quantities, unit prices, and total price are represented by a symbol *. The real data are embedded into the background of the receipt so that information can be kept safely even though the receipt is lost. At the same time, data embedded on the receipt can be scanned and entered into a computer. Although massive halftone screen codes are embedded into the background of the receipt, it is almost impossible to identify with human eyes because the size of the halftone dot is extremely small.

The embodiment and the example for comparison are executed as the following terms.

The code lengths of the embodiment and the compare example are both 16. The number of halftone dots for the experiment is 1600. These halftone dots are embedded into the paper by bar halftone screen code. Five experiments are performed. In every experiment, interference from noises is added into the said halftone dots according to the given random values. When interfered, the halftone dots representing 1 will keep their original values and those representing 0 will change their original values, because the halftone dots represent 1 when polluted on the paper. Therefore, in the embodiment below, concentrated halftone dots will remain the same when interfered, but scattered halftone dots will become concentrated halftone dots when interfered. In addition, the error rates as the experiment results refer to the percentage of incorrect recognition of the halftone screen codes embedded on the paper by the detecting device.

The example for comparison

Table 1 gives the error rates of the example for comparison. 1100110011001100 and 0011110011001100, with a similarity value between codes equals to ¾, are repeatedly embedded. At the same time, the detecting error rates are calculated for 160 halftone dots with 10% interference, 320 halftone dots with 20% interference and 640 halftone dots with 40% interference. And the results are listed in the following table with units in %.

| interference ratio (%) | trials | | | | | |
|---|---|---|---|---|---|---|
| | 1 | 2 | 3 | 4 | 5 | 6 |
| 10 | 1.6 | 1.8 | 1.6 | 1.5 | 1.7 | 1.64 |
| 20 | 5 | 4.6 | 5 | 4.7 | 4.8 | 4.82 |
| 40 | 12 | 13 | 13 | 13 | 13 | 12.8 |

Embodiment 1

Table 2 gives the error rates of the implementation example. 1100110011001100 and 0011110011001100, with a similarity value between codes equals to ½, are repeatedly embedded. At the same time, the detecting error rates are calculated for 160 halftone dots with 10% interference, 320 halftone dots with 20% interference and 640 halftone dots with 40% interference. And the results are listed in the following table with units in %.

| interference ratio (%) | trials | | | | | |
|---|---|---|---|---|---|---|
| | 1 | 2 | 3 | 4 | 5 | 6 |
| 10 | 0.1 | 0 | 0.1 | 0.1 | 0 | 0.06 |
| 20 | 1.1 | 1.1 | 1.1 | 0.9 | 1.1 | 1.1 |
| 40 | 5.1 | 4.8 | 5.1 | 4.6 | 4.6 | 4.84 |

Embodiment 2

Table 3 gives the error rates of the implementation example. 1100110011001100 and 0011110011001100, with a similarity value between codes equals to ¼, are repeatedly embedded. At the same time, the detecting error rates are calculated for 160 halftone dots with 10% interference, 320 halftone dots with 20% interference and 640 halftone dots with 40% interference. And the results are listed in the following table with units in %.

| interference ratio (%) | trials | | | | | |
|---|---|---|---|---|---|---|
| | 1 | 2 | 3 | 4 | 5 | 6 |
| 10 | 0 | 0 | 0 | 0 | 0 | 0 |
| 20 | 0.1 | 0.1 | 0.1 | 0.1 | 0.1 | 0.1 |
| 40 | 2.7 | 2.6 | 2.6 | 3 | 2.8 | 2.74 |

Embodiment 3

Table 4 gives the error rates of the example for comparison. 1100110011001100 and 0011110011001100, with a similarity value between codes equals to 0, are repeatedly embedded. At the same time, the detecting error rates are calculated for 160 halftone dots with 10% interference, 320 halftone dots with 20% interference and 640 halftone dots with 40% interference. And the results are listed in the following table with units in %.

| interference ratio (%) | trials | | | | | |
|---|---|---|---|---|---|---|
| | 1 | 2 | 3 | 4 | 5 | 6 |
| 10 | 0 | 0 | 0 | 0 | 0 | 0 |
| 20 | 0 | 0.1 | 0.1 | 0 | 0.1 | 0.06 |
| 40 | 1.9 | 1.9 | 1.6 | 2 | 1.6 | 1.8 |

As shown in the implementations above, when the halftone dots undergo interference, the lower the similarity between codes, the smaller the detecting error rate; verse vice. It is clearly seen that the detecting error rate is very small when the similarity value is below ½.

What is claimed is:

1. A method of generating a halftone screen code by a computer for embedding information into a type of printed media content comprising at least one pixel, wherein said method comprises the steps of:
    (a) setting a predetermined threshold value of said halftone screen code;
    (b) setting a predetermined code length value of said halftone screen code;
    (c) generating a first group of codes each having said predetermined code length value, wherein each of said codes is represented by a binary bit;
    (d) calculating a similarity value between each two of said codes, wherein said similarity value is expressed as $(n-d)/n$, where d is a distance between two of said corresponding said codes, and n is said predetermined code length value;
    (e) for each two of said codes, comparing said similarity value with said threshold value, wherein when said the similarity value is greater than said threshold value, determining whether said similarity value and said threshold value comparison is completed for all of said codes, wherein when said comparison is not completed for all of said codes, sending said codes with a similarity value smaller than said threshold value as a second group to halftone dots, wherein when said similarity value is less than said threshold value, saving said codes with said similarity value; and
    (f) exchanging said codes with said halftone dots according to different configurations of said halftone dots to form said halftone screen code.

2. The method, as recited in claim 1, wherein said halftone screen code comprises at least one type of predetermined halftone dot morphology representing at least one physical characteristic, wherein said halftone dot morphology comprises at least two types of halftone dots modulated by two or more modulation systems, wherein said types of halftone dots are one of AM halftone dots and FM halftone dots.

3. The method, as recited in claim 1, wherein said halftone screen code comprises at least one type of predetermined halftone dot morphology representing at least one predetermined physical characteristic, wherein said halftone dot morphology comprises halftone dots having different wavelengths and spectra characteristics, including colors, infrared rays and ultraviolet rays.

4. The method, as recited in claim 1, wherein said halftone screen code comprises at least one type of predetermined halftone dot morphology representing at least one predetermined physical characteristic, wherein said halftone dot morphology is formed from halftone screen dots with different frequency characteristics including grayscale characteristics.

5. The method, as recited in claim 1, wherein said halftone screen code comprises at least one type of predetermined halftone dot morphology representing at least one predetermined physical characteristics, wherein said halftone dot morphology is formed from halftone screen dots with different optical characteristics including at least one of different optical polarization directions and optical reflection characteristics.

6. The method, as recited in claim 1, wherein said halftone screen code comprises a predetermined halftone dot morphology representing a predetermined physical characteristic, wherein said halftone dot morphology is formed from halftone dots with different magnetic characteristics including different magnetic field intensities and directions.

7. The method, as recited in claim 2, wherein a number of at least one kind of said halftone dots is either even or odd inside said halftone screen code.

8. The method, as recited in claim 3, wherein a number of at least one kind of said halftone dots is either even or odd inside said halftone screen code.

9. The method, as recited in claim 4, wherein a number of at least one kind of said halftone dots is either even or odd inside said halftone screen code.

10. The method, as recited in claim 5, wherein a number of at least one kind of said halftone dots is either even or odd inside said halftone screen code.

11. The method, as recited in claim 6, wherein a number of at least one kind of said halftone dots is either even or odd inside said halftone screen code.

12. The method, as recited in claim 2, wherein when two types of morphology of said halftone dots exist, said two types of halftone dots are arrayed symmetrically inside said halftone screen code.

13. The method, as recited in claim 3, wherein when two types of morphology of said halftone dots exist, said two types of halftone dots are arrayed symmetrically inside said halftone screen code.

14. The method, as recited in claim 4, wherein when two types of morphology of said halftone dots exist, said two types of halftone dots are arrayed symmetrically inside said halftone screen code.

15. The method, as recited in claim 5, wherein when two types of morphology of said halftone dots exist, said two types of halftone dots are arrayed symmetrically inside said halftone screen code.

16. The method, as recited in claim 6, wherein when two types of morphology of said halftone dots exist, said two types of halftone dots are arrayed symmetrically inside said halftone screen code.

17. The method, as recited in claim 1, wherein in said step (a), said threshold value is 0.5.

18. The method, as recited in claim 1, wherein in said step (a), said threshold value is 0.25.

19. The method, as recited in claim 17, further comprising the steps of:
(g) recording a target image via a scanning means to obtain an image data;
(h) analyzing said image data to obtain a pixel analysis to obtain pixel characteristic data;
(i) sending said pixel analysis into an information embedded code;
(j) embedding a predetermined information into said halftone screen code;
(k) replacing said pixel characteristic data with encoded information; and
(l) exchanging pixels from said image data.

20. A method of generating a halftone screen code by a computer for embedding information into a type of printed media content comprising at least one pixel, wherein said method comprises the steps of:
(a.1) setting a predetermined threshold value of said halftone screen code;
(b.1) setting a predetermined code length value of said halftone screen code;
(c.1) generating a plurality of codes each having said predetermined code length value, wherein each of said codes is represented by a binary bit;
(d.1) calculating a maximum similarity value between said codes from equations 1 and 2, wherein the equation 1 is:

$$d_{min} = \min d(S_k, S_l); \text{ and}$$

the equation 2 is:

$$A_{max} = \frac{n - d_{min}}{n}$$

where $S_k$ and $S_l$ are information codes, n is a code length, m is a code quantity, $d(S_k, S_l)$ is a distance between information codes $S_k$ and $S_l$, k, l =0, 1, 2, ... m-1;
(e.1) saving said codes with said maximum similarity value when said maximum similarity value is less than said predetermined threshold value; and
(f.1) exchanging said codes with halftone dots according to different configurations of said halftone dots to form said halftone screen code.

* * * * *